United States Patent [19]
Lace

[11] 3,739,366
[45] June 12, 1973

[54] FLOWMETER FOR ENGINE COOLING SYSTEM

[75] Inventor: Melvin A. Lace, Prospect Heights, Ill.

[73] Assignee: Motorola, Inc., Franklin Park, Ill.

[22] Filed: June 14, 1971

[21] Appl. No.: 152,928

[52] U.S. Cl. .............. 340/239 R, 324/65 P, 340/59
[51] Int. Cl. ............................................ G08b 21/00
[58] Field of Search................. 340/239, 244 C, 59; 200/61.04, 61.05, 61.49–61.52, 81.9; 317/246, 249 R; 73/194 E, 228; 324/61 P, 65 P

[56] References Cited
UNITED STATES PATENTS

| | | | |
|---|---|---|---|
| 2,110,761 | 3/1938 | Diamond et al.......... | 317/249 R UX |
| 2,311,637 | 2/1943 | Buchanan.................... | 200/61.49 |
| 3,226,615 | 12/1965 | Nagel........................ | 317/246 |
| 1,693,309 | 11/1928 | Mettler..................... | 200/81.9 R |

Primary Examiner—John W. Caldwell
Assistant Examiner—Daniel Myer
Attorney—Vincent Rauner and Hank Olsen

[57] ABSTRACT

A flowmeter senses the flow rate in an engine cooling system to provide an indication of an extraordinary condition as when the water pump or one of the fluid conducting hoses would become inoperative. The flowmeter sensor comprises a pair of stationary electrodes located adjacent to and on either side of a flexible electrode which is deflected by the current flow. A relatively high frequency alternating current produces a field between the two stationary electrodes and the deflecting electrode will assume a potential based on its location in the field. A threshold detection circuit is connected to the deflecting electrode whereby a change in its apparent voltage will actuate a warning device.

14 Claims, 3 Drawing Figures

Patented June 12, 1973

3,739,366

INVENTOR:
MELVIN A. LACE
BY: Henry T. Olsen
ATTY.

FLOWMETER FOR ENGINE COOLING SYSTEM

BACKGROUND OF THE INVENTION

This invention relates to engine cooling systems and more particularly to a flowmeter for detecting the condition of flow in an engine cooling system.

Continued proper flow of the cooling fluid through an engine is required to prevent permanent damage to the engine because of over heating. The flow is normally detected indirectly by a temperature sensor which indicates an over temperature condition when the flow is improper. Such indirect sensing leaves a built-in time lag which is undesirable particularly in truck engine cooling systems and other heavy equipment, because by the time the temperature rise is indicated, the engine may have already been permanently damaged. For example, if a bottom connecting hose between the engine and the radiator were to break the engine would be rapidly depleted of all cooling fluid and the radiator would still indicate a normal temperature. Only when the radiator fluid was lost through the same break would the temperature sensor indicate the dangerous rise of temperature. By this time the engine may have been at a high temperature for a long enough period to effect permanent damage.

Engine cooling systems which incorporate a mechanism for directly determining proper flow therein have been previously suggested. However, such systems have not been satisfactory because the sensing mechanism could not reliably withstand the adverse conditions encountered in operating in the cooling fluid environment. In the cooling system the sensor is required to operate in a temperature range from a −41° to a +250° Farenheit. The sensor must also withstand vibration forces of up to 25 G., while also withstanding any chemical deterioration such as might be encountered as a result of contact with the cooling fluid. Further, since particulate material can be present in the cooling system the sensor must not trap or be effected by such particulate material so as to give ineffective warnings.

SUMMARY OF THE INVENTION

It is an object of this invention to provide an engine cooling system which incorporates means for directly sensing the condition of flow in the system.

It is a further object of this invention to provide an improved engine cooling system which includes a sensor located directly in the cooling stream for detecting the flow rate of the coolant.

A still further object of this invention is to provide an engine cooling system for use in trucks or other heavy equipment which rapidly detects low or non-existant coolant flow in a direct and expeditious manner.

Another ojbect of the invention is to provide a sensor for determining the flow rate in an engine cooling system which can be directly located in the coolant stream.

Still another object of the invention is to provide a sensor for an engine cooling system which can satisfactorily withstand the adverse temperature, vibration and chemical deterioration conditions encountered in the system.

A further object of the invention is to provide a warning system for an engine cooling system which gives a rapid reliable indication of improper operation of the cooling system.

THE DRAWINGS

Further objects and advantages of the invention will be understood from the following complete specification and from the drawings wherein.

Figure 1:
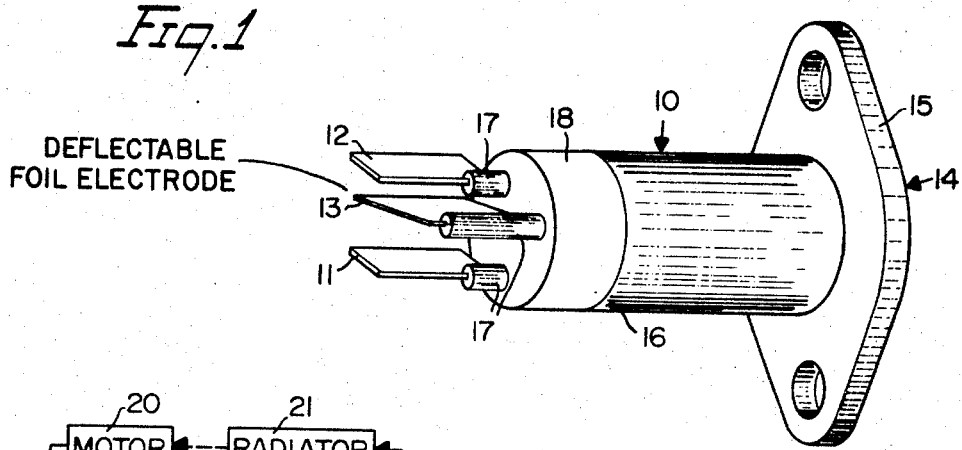
FIG. 1 is a perspective view of a flow sensor in accordance with the preferred embodiment of the invention.

As shown in FIG. 1 in accordance with the preferred enbodiment a flow sensor 10 includes first, second and third electrodes 11, 12 and 13, respectively, in a support structure 14 for mounting the sensor in the coolant stream of an engine. The support structure 14 comprises a flange 15 and a barrel 16 made integral therewith. Three support conductors 17, extend through and from the end of the barrel 16 and are supported in spaced relation from the barrel and from each other by an insulating member 18. The electrodes 11 and 12 are secured to respective conductor supports 17 so as to be substantially parallel to each other. The electrode 13 is secured to the third conductor support 17 so as to be as an angle with respect to the electrodes 11 and 12.

The sensor 10 may be readily assembled by jigging the conductor supports 17 in the desired arrangement within the barrel 16 of the support member 14 and then pouring a molding or potting compound around the conductor support 17 to fill the space surrounding the wires. The filling or potting material may be of any suitable insulative material capable of withstanding the temperature of the engine cooling system environment such as a glass, an epoxy, or a ceramic. The electrodes 11, 12 and 13 may then be secured to the respective conductive supports 17 by any suitable means such as welding or soldering. The electrodes 11 and 12 as aforestated are secured to the support wire 17 in a parallel plate fashion and may consist of, for example, copper plates approximately 100 mils thick. The electrode 13 is a foil electrode which may be of copper having a thickness of approximately 10 mils which is secured to the support conductor at an angle with respect to the first and second electrodes 11 and 12 so as to be deflectable by the coolant stream into a generally parallel relationship with the first and second electrodes 11 and 12.

Figure 2:
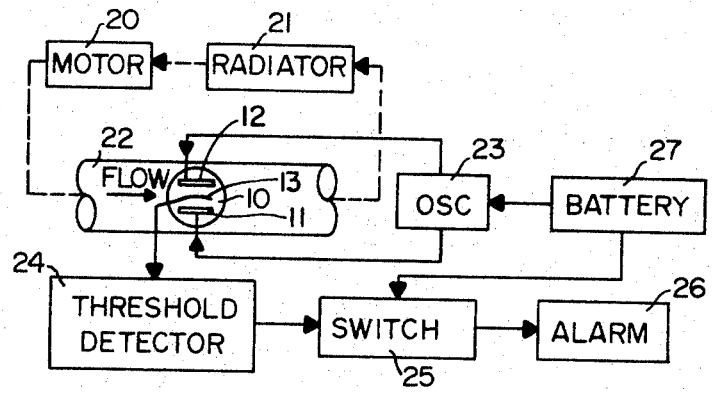
FIG. 2 is a block diagram of an engine cooling system embodying the invention.

An engine cooling system in accordance with applicant's invention is schematically shown in FIG. 2 and includes the motor 20, a radiator 21 and flow sensor 10 mounted preferably in a conduit 22 which is a portion of the coolant return path from the motor to the radiator. The sensor 10 is mounted by flange 15 in the conduit 22 so that first and second electrodes 11 and 12 are parallel to the direction of coolant flow. Thus, when there is no flow of coolant, the foil electrode 13 is at an angle with respect to the direction of flow and when there is a normal flow of coolant fluid, the foil electrode will bend to assume a position generally parallel to the direction of flow and hence, parallel generally also to the first and second electrodes 11 and 12. Thus, the bending of the foil electrode 13 between the rigid plate electrodes 11 and 12 will serve to indicate the proper flow in the cooling system whereas when the flow is insufficient or completely lacking so as to permit the foil electrode 13 to assume a straight position, a condition of improper flow will be indicated.

The first and second electrodes 11 and 12 of the sensor 10 is powered by an oscillator 23 and the foil electrode 13 is connected to an output threshold detector 24. The threshold detector 24 on detection of an improper conditon operates a switch 25 to sound an alarm 26. A power source 27 which may be the normal battery for an automotive system provides electrical energy for operating the system. Thus, the electrical energy from the battery through oscillator 23 produces a relatively high frequency A.C. current between the electrodes 11 and 12 through the coolant fluid. Because of the field created between the electrodes 11, 12 the electrode 13 will assume a potential indicative of its position in the field.

When the electrode 13 shifts its position because of a lack of flow of coolant fluid the change of potential will be detected by the threshold detector 24 to cause operation of the alarm 26 when the switch 25 is closed.

Figure 3:
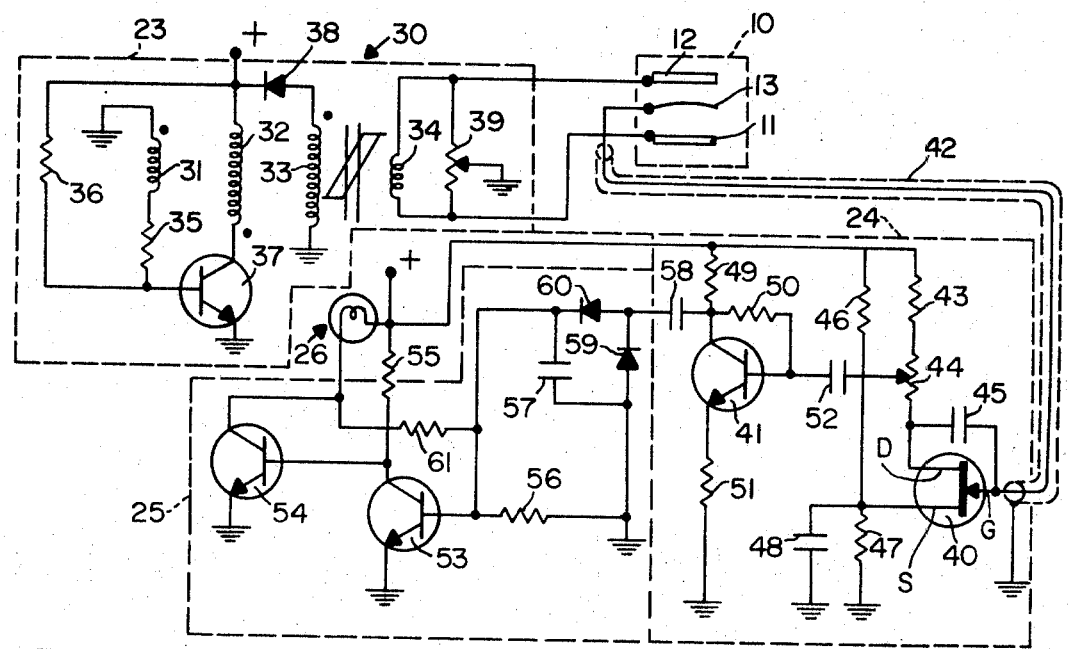
FIG. 3 is a circuit schematic of the detection and warning system.

A circuit schematic for the power supply and alarm unit is shown more particularly in FIG. 3. The oscillator unit 23 comprises a saturable transformer 30 which preferably is a ferrite toroidal core unit having three input windings 31, 32 and 33 and the output winding 34. The first winding 31 has one side connected to ground and the other side connected to a positive voltage source through resistors 35 and 36. The second winding 32 is connected to the positive voltage source and to ground through transistor 37. The third input winding 33 is connected to ground and to the positive voltage source through diode 38. The transistor 37 is connected with its collector connected to the input winding 32, its emitter connected to ground and its base connected between resistors 35 and 36. Thus, assuming transistor 37 to have its collector base junction forward biased and hence on, current flows through the winding 32 which then makes the base of the transistor positive with respect to the collector to turn the transistor off. With the transistor 37 off, the current flow is then in the reverse sense through winding 33 and diode 38 together with similar sense current in the winding 31. This current flow again makes the collector of the transistor 37 positive with respect to the base to forward bias the transistor on and again reverse the current in the transformer core. This oscillatory action is set by the characteristics of the core and the components to be at approximately 2,000 Hz, thus creating in the output winding 34 a relatively high frequency AC current which is applied between electrodes 11 and 12 of the sensor 10. A variable resistor 39 is connected across the winding 34 and to ground to balance the current flow between the electrodes. The small AC current flow between electrodes 11 and 12 establishes the electrode 13 at a potential determined by its position in the field.

The threshold detector unit comprises a field effect transistor 40 and an amplifying transistor 41. The gate of the field effect transistor 40 is connected to the electrode 13 of the sensor unit 10 through a co-axial line 42. The source of the transistor 40 is connected to a positive voltage source through a resistance 43 and a variable resistor 44 and a capacitive feedback loop 45 is provided between the source and the gate electrode. A voltage divider network including resistors 46 and 47 and shunt capacitor 48 sets the voltage of the drain electrode of the transistor 40. The operating point of the collector base junction of transistor 41 is set by the voltage dividing resistors 49 and 50 and its emitter is connected to ground through limiting resistor 51. The base of the transistor 41 is connected back to the source of transistor 40 through blocking capacitor 52 and variable resistor 44, the variable resistor 44 thereby providing means for adjusting the sensing level of the threshold detector 24.

The switching circuit 25 includes a pair of cascaded transistors 53 and 54 in a grounded emitter configuration. The collector to base connection between transistors 53 and 54 is biased from the positive supply source through resistor 55 and base bias for the transistor 53 is provided by resistor 56 and capacitor 57. A blocking capacitor 58 and branch diodes 59 and 60 provide the input from the detector circuit 24. The switching signal for driving the alarm device 26 is derived from the collector electrode of the transistor 54, the alarm device in this case being depicted as an incandescent signal lamp, although the alarm may be of any other type. Thus it will be seen that under normal conditions a flow of engine cooling system the variable resistance 44 will be set to balance against the potential of the electrode 13 to indicate normal flow. Should the flow stop the potential of electrode 13 will increase gating the transistor 40 to produce a signal from the collector of transistor 41 to the base of transistor 53 and 54 to latch transistors 53 and 54 into an on condition. Current flow through transistor 54 lights the lamp 26 with a feedback resistor loop 61 tending to hold transistor 53 in an on condition.

Thus it will be seen that there is provided an engine cooling system which includes a flowmeter for rapidly and economically detecting any improper condition in the operation of the cooling system of the engine. The sensor is of a sturdy simple construction which is well capable of withstanding sharp vibration and the temperature conditions in the engine cooling system. While the invention has been disclosed by way of the preferred embodiment it will be appreciated that suitable modifications may be made therein without departing from the spirit and scope of the invention.

What is claimed is:

1. A flowmeter sensor for placement in a stream of cooling fluid of an engine cooling system comprising first and second parallel stationary electrodes electrically insulated from each other and spaced to allow the cooling fluid to flow therebetween, and a third electrode electrically insulated from said first and second stationary electrodes mounted askew between said stationary electrodes and spaced therefrom, said third electrode being mounted for deflection by said stream of cooling fluid to a position approaching a parallel relationship to said first and second stationary electrodes.

2. A flowmeter sensor for an engine cooling system as recited in claim 1 wherein said third electrode is a deflectable foil electrode and said electrodes are supported in spaced relation by an insulator member.

3. A flowmeter sensor for an engine cooling system as recited in claim 2 and further including means for mounting said sensor in an engine cooling system.

4. A flowmeter sensor for an engine cooling system as recited in claim 3 wherein said means for mounting said sensor comprises a flange and a barrel integral therewith surrounding said insulator member.

5. A flowmeter sensor for an engine cooling system as recited in claim 4 wherein said electrodes are supported from said insulator member by a plurality of conductive support members making electrical contact to said electrodes.

6. A flowmeter system for an engine comprising electrode means for sensing the flow of coolant, said electrode means including a first electrode and a deflectable electrode mounted for deflection by the flow of coolant, means connected to said electrode means for applying an alternating current to one of said electrodes, alternating current responsive threshold detector means connected to the other of said electrodes for detecting the potential of the alternating current thereat, said potential being related to the position of said deflectable electrode as determined by the flow of coolant through said system, and alarm means responsive to said threshold detector means for indicating improper coolant flow connected to said threshold detector means.

7. A flowmeter system for an engine as recited in claim 6 wherein said sensing means further includes a second electrode mounted parallel to said first electrode and spaced therefrom, said deflectable electrode being mounted intermediate said first and second electrodes.

8. A flowmeter system for an engine as recited in claim 7 wherein said means for applying said alternating current is connected to said first and second electrodes for applying a relatively high frequency alternating current thereto, and said threshold detector means is connected to said deflectable electrode.

9. A flowmeter system for an engine as recited in claim 8 wherein said threshold detector is connected to a switch which turns on an alarm.

10. A flowmeter system for an engine as rectied in claim 9 wherein said alarm is an indicator lamp.

11. An engine cooling system comprising a conduit for carrying a flow of cooling fluid, a flowmeter sensor located in said conduit, said flowmeter sensor having first and second spaced parallel stationary electrodes and a deflectable foil electrode mounted intermediate said first and second stationary electrodes and at an angle thereto, said foil electrode being deflectable by the flow of cooling fluid in said conduit, means connected to said deflectable foil electrode for sensing the position thereof, and alarm means connected to said sensing means and responsive thereto for providing an alarm indicative of improper flow of cooling fluid.

12. An engine cooling system as recited in claim 11 wherein said first and second spaced parallel stationary electrodes are mounted in the conduit parallel to the direction of flow of the cooling fluid.

13. An engine cooling system as recited in claim 12 and further including oscillator means connected to said stationary electrodes for applying a relatively high frequency alternating current thereto.

14. An engine cooling system as recited in claim 12 and further including threshold detector circuit means connected to said deflectable electrode for sensing a change of potential thereat.

* * * * *